May 27, 1969 J. W. GEWARTOWSKI 3,447,102

MICROWAVE FREQUENCY CONVERTERS COMPRISING MULTI-PORT DIRECTIONAL COUPLERS

Filed May 6, 1966

INVENTOR
J. W. GEWARTOWSKI
BY
Roderick B. Anderson
ATTORNEY

United States Patent Office 3,447,102

Patented May 27, 1969

3,447,102

MICROWAVE FREQUENCY CONVERTERS COMPRISING MULTI-PORT DIRECTIONAL COUPLERS

James W. Gewartowski, Chatham, N.J., assignor to Bell Telephone Laboratories, Incorporated, Murray Hill, N.J., a corporation of New York Filed May 6, 1966, Ser. No. 548,310
Int. Cl. H03c *3/20*
U.S. Cl. 332—30 13 Claims

ABSTRACT OF THE DISCLOSURE

A frequency converter is disclosed comprising a multi-port directional coupler that inherently separates generated upper and lower sideband frequencies without using filters. The signal is applied at selected phase angles to several substantially identical nonlinear elements, each connected to one of the ports of the coupler; and pump energy is also applied to these nonlinear elements. With the proper combination of phase shifts, the resulting signals are then combined so that only upper sideband energy appears at one port of the coupler and only lower sideband energy at another port.

This invention relates primarily to frequency converters and to directional couplers for use in frequency converters; the particular directional couplers described may, however, be used in other circuits as well.

In high frequency communications systems it is frequently desirable to convert the frequency of a microwave signal to obtain output frequencies that are either higher or lower than the signal frequency. As is described, for example, in the paper, "A General Catalog of Gain, Bandwidth and Noise Temperature Expressions for Four-Frequency Parametric Devices," by D. B. Anderson and J. C. Aukland, "IEEE Transactions on Electron Devices," vol. ED–10, p. 13, January 1963, a frequency converter comprising a nonlinear parametric device such as a varactor diode offers several advantages such as selective amplification of the output frequencies and low noise conversion. When the signal frequency and an appropriate "pump" frequency are applied to the nonlinear element, output frequencies are generated at the sum of the signal and pump frequencies (the upper sideband frequency) and at the difference of the signal and pump frequencies (the lower sideband frequency).

For most purposes, it is desirable to separate the output upper and lower sideband frequencies while minimizing losses. The output frequencies are normally segregated by electrical filters which unfortunately tend to attenuate the output power in addition to contributing to the bulk and expense of the apparatus. While the output power can be increased by connecting additional nonlinear elements in series, this is difficult because of the small space usually available at microwave frequencies. Theoretically, the power output would increase in direct proportion to the number of parrallel connected nonlinear elements, but this approach ordinarily poses severe problems because of the difficulty of combining in phase the outputs of several parallel connected elements and the difficulty of matching the resulting lower impedance level.

Accordingly, it is an object of this invention to increase the attainable power of microwave frequency converters.

It is another object of this invention to separate different microwave frequencies without using electrical filters.

It is still another object of this invention to provide frequency converting apparatus that is capable of combining the outputs of several parrallel-connected nonlinear elements without the penalty of lower impedance.

These and other objects of the invention are attained in a frequency converter comprising a six-port directional coupler that inherently separates generated upper and lower sideband frequencies without using filters. Substantially identical nonlinear elements such as varactor diodes are connected to ports 4, 5, and 6 of the network. Signal frequency energy at different phase angles is applied directly to the nonlinear elements connected to ports 4, 5, and 6 and pump energy is applied to port 2 of the network. Ports 1, 2, and 3 are interconnected with ports 4, 5, and 6 by paths providing relative phase shifts of 0 degrees, 120 degrees, or 240 degrees and equal power division. With the proper combination of phase shifts, upper sideband energy can be made to appear solely at port 1, and lower sideband energy solely at port 3.

In accordance with a feature of the invention port 1 is interconnected with ports 4, 5, and 6 by transmission paths that respectively provide relative phase shifts of 0 degrees, 120 degrees, and 240 degrees; port 2 is interconnected with ports 4, 5, and 6 by transmission paths that each provide relative phase shifts of 120 degrees; and port 3 is interconnected with ports 4, 5, and 6 by transmission paths that respectively provide relative phase shifts of 240 degrees, 120 degrees, and 0 degrees. Since pump energy enters through port 2, it has the same phase at each diode. Signal energy is applied in equal quantities to the diodes as follows: signal energy is applied to the diode of port 4 at a relative phase angle of 120 degrees, to the diode of port 5 at a relative phase angle of 0 degrees, and to the diode of port 6 at a relative phase angle of −120 degrees. Under these conditions, the generated upper sideband frequency is delivered entirely to port 1, and the lower sideband frequency entirely to port 3 as described before.

The separation of the output frequencies is accomplished without filters, which enhances efficiency and reduces apparatus bulk and expense. Further, the maximum attainable power is effectively trebled. For example, if $n$ is the maximum number of nonlinear elements that can practicably be connected in series, and if $n$ elements together deliver a maximum power output P, then $n$ elements can be connected to each of the ports 4, 5, and 6; the total of $3n$ elements in parallel delivers a total output power 3P. Also, the elements are electrically isolated from the circuits of ports 1 through 3, which minimize impedance matching problems.

In accordance with one embodiment of the invention, the directional coupler network comprises three waveguides connected to one side of a coupling section and three waveguides connected to the other side of the coupling section. The ends of the waveguides opposite the coupling section constitute the six ports of the network. The directional coupler is constructed to be electrically symmetrical about a plane that substantially bisects waveguides of ports 2 and 5, and also symmetrical about a plane through the coupling section that is equidistant from all the waveguides.

The coupling section is constructed so as to support the $TE_{10}$, $TE_{20}$, and $TE_{30}$ electromagnetic wave modes of oscillation. It is further constructed to provide relative phase shifts between waveguides on the opposite sides of the coupling section of 0 degrees in the $TE_{10}$ mode, 180 degrees in the $TE_{20}$ mode, and −120 degrees in the $TE_{30}$ mode. Further, the waveguides of ports 1, 3, 4, and 6 are of the same length, but the waveguides of ports 2 and 5 are both made 60 electrical degrees longer than the remaining waveguides. Under these conditions, the directional coupler will provide transmission paths interconnecting ports 1, 2, and 3 with ports 4, 5, and 6 having the phase shifts described above and equal power division.

These and other objects, features, and advantages of the invention will be better understood from a consideration of the following detailed description taken in conjunction with the accompanying drawing in which.

Figure 1:
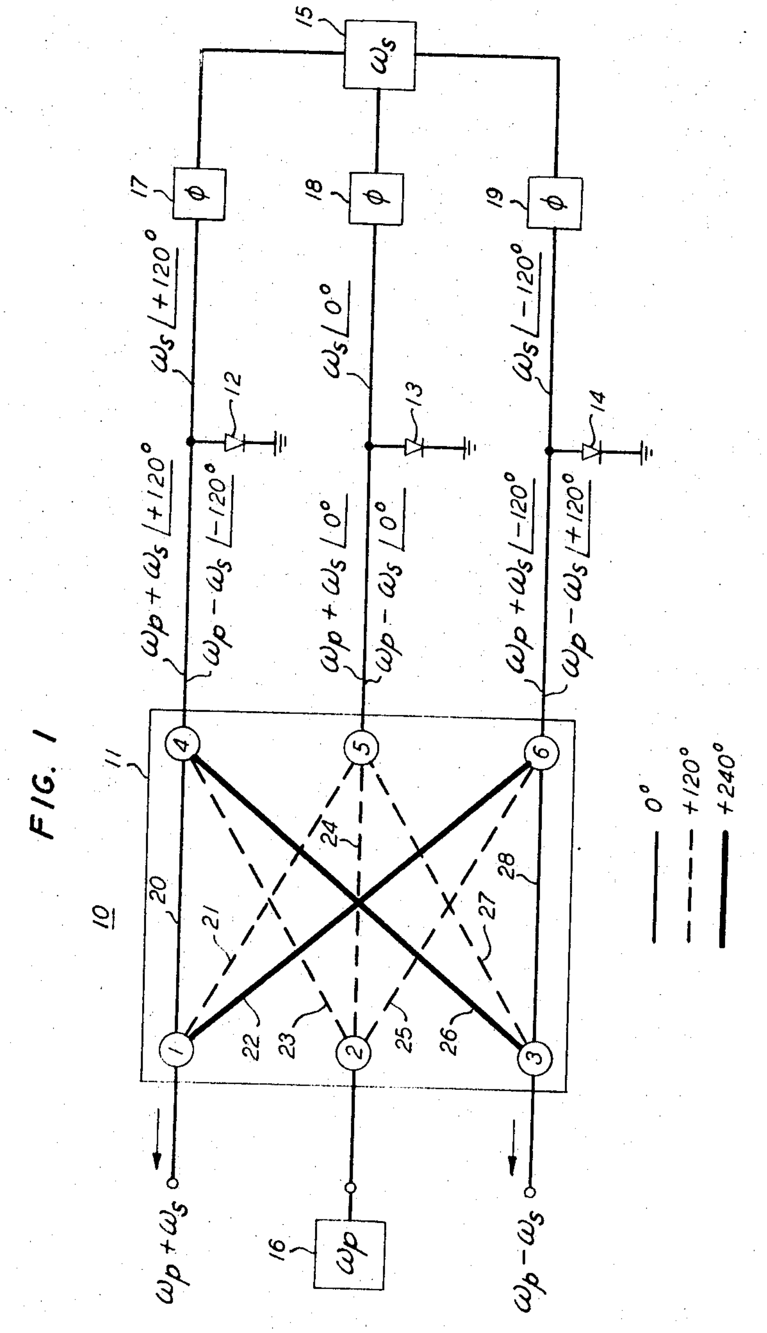
FIG. 1 is a schematic illustration of a frequency converter in accordance with an illustrative embodiment of the invention.

Referring now to FIG. 1, there is shown a frequency converter 10 comprising a six-port directional coupler 11 and substantially identical nonlinear elements 12, 13, and 14 which are respectively connected to ports 4, 5, and 6 of the directional coupler. The purpose of the illustrative frequency converter is to mix microwave frequency pump energy from a source 16 with signal frequency energy from a source 15 and thereby generate upper and lower sideband frequencies. Signal energy from source 15 is delivered to the elements 12, 13, and 14 by way of phase shifters 17, 18, and 19 which are constructed so that signal frequency energy $\omega_s$ is delivered at the three elements at the relative phase angles shown in the figure; that is $\omega_s$ arrives at element 12 a relative phase angle of 120 degrees, at element 13 at 0 degrees, and at element 14 at −120 degrees. Pump energy is applied to all of the elements at the same relative phase angle. The reference pump phase angle of 0 degrees is taken as the sum of the phase angle of pump energy delivered to the diodes plus any phase shift due to circuit tuning parameters. The phase shifters 17, 18, and 19 are shown only for the purpose of illustrating a particular circuit function; in actual practice the desired phase angles could ordinarily be obtained by merely controlling the respective transmission line lengths.

In a preferred embodiment, the pump frequency $\omega_p$ is about 6 kilomegacycles per second and the signal frequency $\omega_s$ is approximately 70 megacycles per second. The nonlinear elements 12, 13, and 14 are variable reactance diodes known as varactors which generate upper and lower sideband frequencies in accordance with the principles of parametric frequency conversion. These elements are preferably mounted in waveguides in any of a number of known ways. The energy derived from source 16 is referred to as pump frequency energy only because that is the customary term used in connection with parametric frequency converters. The nonlinear elements 12, 13, and 14 could instead, if so desired, be nonlinear resistances and the source 16 could be considered a local oscillator frequency source. Likewise, the frequency converter 10 could be considered as being a mixer, a modulator, or a detector, since these terms are used rather loosely in the art and generally designate the function of a frequency converter in a communications system. In response to the pump signal frequencies, the nonlinear elements of FIG. 1 generate upper and lower sideband frequencies $\omega_p+\omega_s$ and $\omega_p-\omega_s$ which are directed back toward the directional coupler 11 at relative phase angles shown in the drawing.

The purpose of the directional coupler 11 is to distribute equally the pump frequency $\omega_p$ to each of the nonlinear elements, and to separate the generated upper and lower sideband frequencies. Ports 1, 2, 3 of the coupler are connected with ports 4, 5, and 6 by transmission paths equally divide incoming energy and provide relative phase shifts as shown by the legend beneath the figure. Port 1 is connected to ports 4, 5, and 6 by transmission paths 20, 21, and 22, that provide respective relative phase shifts of 0 degrees, 120 degrees, 240 degrees; port 2 is interconnected with ports 4, 5, and 6 by transmission paths 23, 24, and 25, that each provide relative phase shifts of 120 degrees; port 3 is connected to ports 4, 5, and 6 by paths 26, 27, and 28 that provide respective relative phase shifts of 240 degrees, 120 degrees, and 0 degrees. As will be shown later, with the signal and pump frequencies applied to the nonlinear elements as shown, the generated uper sideband frequency $\omega_p+\omega_s$ will appear substantially solely at port 1, and the lower sideband frequency $\omega_p-\omega_s$ will appear substantially solely at port 3. These two frequencies are therefore conveniently separated without the use of filters and are derived from the converter as separate outputs as shown by the output arrows.

In order to understand how the converter 10 works and why it inherently separates the output frequencies, consider first the amplitude $a$ of the pump frequency and the amplitude $b$ of the signal frequency delivered to each of the nonlinear elements, $$a=A\cos(\omega_p t+\alpha) \qquad (1)$$

and $$b=B\cos(\omega_s t+\beta) \qquad (2)$$

where $\alpha$ is the phase angle of the pump energy delivered to the nonlinear elements and $\beta$ is the phase angle of the signal energy delivered to the elements. The upper sideband output then has the form $$d=D\cos(\omega_p t+\omega_s t+\alpha-\beta+\gamma) \qquad (3)$$

and the lower sideband output has the form $$e=E\cos(\omega_p t-\omega_s t+\alpha-\beta+\delta) \qquad (4)$$

where $\gamma$ and $\delta$ are circuit tuning parameters. Since $\alpha$, $\gamma$ and $\delta$ are the same for each of the identical nonlinear elements, the upper sideband frequency has a relative phase angle which is equal to the phase angle of the applied signal frequency while the lower sideband frequency has a relative phase angle that is equal to the negative of the phase angle of the applied signal frequency, as is shown in FIG. 1. Notice that the phase angle $\alpha$ of the pump frequency applied to each of the nonlinear elements is equal because the paths 23, 24, and 25 over which it is distributed each provide equal 120 degree phase shifts.

By adding the initial phase angles of the output frequencies with the phase shifts provided by paths 20–28, one can determine the phase angles at which the outputs appear at ports 1, 2, and 3 of the directional coupler. For example, the upper sideband frequency generated by element 12 has an initial phase angle of +120 degrees and is transmitted on path 20 with a 0 degree relative phase shift so that it has a relative 120 degree phase angle at port 1. Upper sideband frequency energy from element 13 has an initial phase angle of 0 degrees, but when transmitted on path 21, it appears at port 1 with a relative phase angle of 120 degrees. The upper sideband frequency from element 14 has an initial phase angle of −120 degrees, but a relative phase angle at port 1 of +120 degrees. Hence, all of the upper sideband frequency components add together in phase at port 1 and can be therefore derived at port 1 from the directional coupler.

Similar examination, however, shows that uppeer sideband energy arrives at port 2 from path 23 at a relative phase angle of 240 degrees, from path 24 at 120 degrees, and from path 25 at 0 degrees. Since the vector sum of equal vectors at 0 degrees, 120 degrees, and 240 degrees is zero, the three upper sideband components at port 2 are mutually destructive and no upper sideband energy appears at port 2. Likewise, at port 3, upper sideband energy arrives from paths 26, 27, and 28 with respective relative phase angles of 360 degrees, 120 degrees, and −120 degress. Again, the three upper sideband components are mutually destructive and no upper sideband energy appears at port 3.

A similar examination shows that the lower sideband frequency $\omega_p-\omega_s$ has at port 4 an initial phase angle of −120 degrees and on path 26 a relative phase shift of +240 degrees so that it arrives at port 3 at a relative phase angle of +120 degrees. Likewise, lower sideband energy from paths 27 and 28 also arrive at port 3 at 120 degrees so that all three components add constructively. Lower sideband frequency is therefore derived from port 3 as shown. At ports 2 and 1, however, the lower sideband components interfere destructively, and no net lower sideband energy appears at these ports.

Given the functional diagram of the directional coupler 11 as shown in FIG. 1, one skilled in the art can construct a workable directional coupler in a number of different ways; for example, by the technique described in C. B. Burckhardt's U.S. Patent No. 3,355,655, issued Nov. 28, 1967. The Burckhardt technique comprises the steps of formulating a scattering matrix of the coupler network, computing from the scattering matrix an admittance matrix, synthesizing the admittance matrix to describe a circuit diagram in terms of path wavelengths and characteristic admittances, and then constructing a combined strip line and coaxial cable circuit that conforms to the synthesized circuit. One drawback of the Burckhardt structure is the limited bandwidths of strip transmission lines and coaxial cables. For the directional coupler 11 of FIG. 1 to work properly, all of the transmission paths should have bandwidths that are sufficiently wide to include both $\omega_p - \omega_s$ and $\omega_p + \omega_s$.

Figure 2:
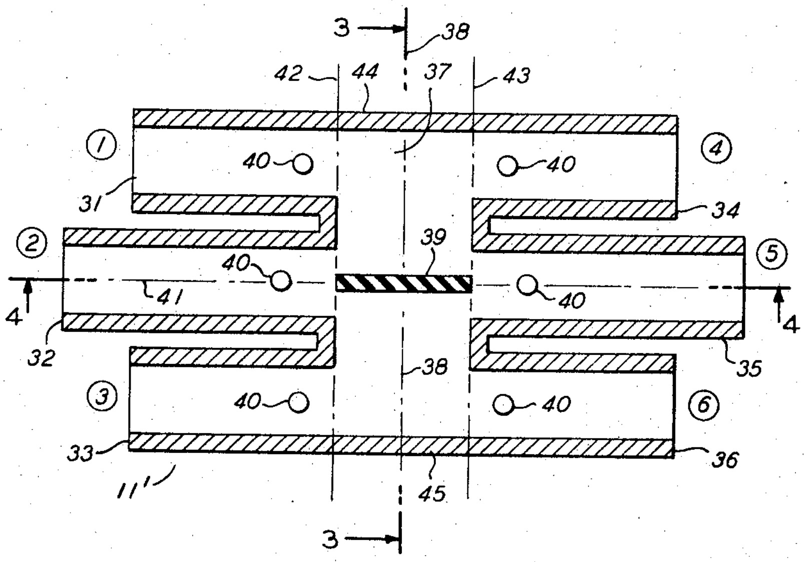
FIG. 2 is a sectional view of a directional coupler that may be used in the embodiment of FIG. 1.

In accordance with another feature of the invention, FIG. 2 shows a directional coupler 11' which is capable of transmitting energy in accordance with the functional diagram of coupler 11 of FIG. 1 over a broader frequency band than could ordinarily be obtained from strip line and coaxial cable structures. Directional coupler 11' comprises waveguides 31 through 36, each having one end that constitutes one of the ports 1 through 6 and another end which communicates with a coupling section 37. The directional coupler 11' is electrically symmetrical about a plane 38 that is equidistant from the abutting ends of the various waveguides and about a plane 41 that bisects waveguides 32 and 35. A thin dielectric slab 39 is located in the coupling section along plane 41. Turning screws 40 are located in each of the waveguides for adjusting the impedance match. All the waveguides are designed to propagate energy in the $TE_{10}$ mode but waveguides 32 and 35 are each approximately 60 electrical degrees longer than the remaining waveguides.

Figure 3:
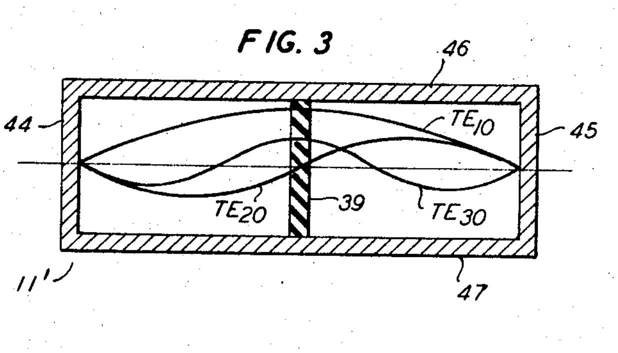
FIG. 3 is a view taken along lines 3—3 of FIG. 2 which illustrates the formation of oscillatory modes in the directional coupler.
Figure 4:
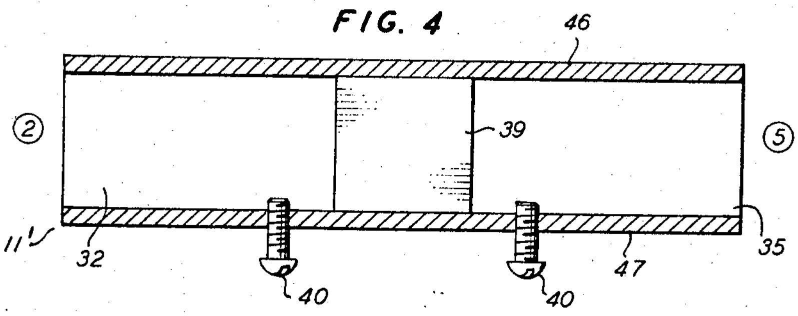
FIG. 4 is a view taken along lines 4—4 of FIG. 2.

For the purposes of this discussion, the coupling section 37 shall be considered to be defined by planes 42 and 43 which also define the abutting ends of the waveguides 31–36, by an end wall 44 that interconnects waveguides 31 and 34, and an end wall 45 that interconnects waveguides 33 and 36. As shown in FIGS. 3 and 4, the coupling section is also bounded by a top wall 46 and a bottom wall 47.

The coupling section 37 is constructed so as to propagate wave energy between planes 42 and 43 within the frequency band of interest in any of only three modes of propagation, the $TE_{10}$, the $TE_{20}$, and the $TE_{30}$ wave modes. The electric field distribution of each of these modes between end walls 44 and 45 are illustrated in FIG. 3. Further, the coupler section 37 is designed such that the $TE_{10}$, $TE_{20}$, and $TE_{30}$ modes respectively provide relative phase shifts to energy propagating between planes 42 and 43 of approximately 0 degrees, 180 degrees, and −120 degrees. That is, with the phase shift of energy in the $TE_{10}$ mode as a refrence, the phase of energy propagating in the $TE_{20}$ mode will be shifted by 180 degrees, and that of the $TE_{30}$ mode will be shifted by −120 degrees.

It can be shown that a directional coupler 11' designed to fulfill the criteria describd above will provide transmission paths between the various ports that correspond to the paths illustrated in FIG. 1. A rigorous verification of this function would involve examination of relative phase diagrams at the six ports of the directional coupler, and at the ends of the waveguides that lie along planes 42 and 43 for each of the various possible inputs to the directional coupler. While such verification would be unduly cumbersome, it can be seen intuitively, for example, that the input pump energy at waveguide 32 excites only the $TE_{10}$ and $TE_{30}$ modes in the coupling section because the $TE_{20}$ mode is at a null at plane 41. At waveguides 31 and 33 the excited $TE_{10}$ and $TE_{30}$ modes are out of phase and so no energy is coupled out at ports 1 and 3. Energy is, however, coupled out at waveguides 34, 35, 36 because of the differential phase shift of energy propagation between planes 42 and 43 in the $TE_{10}$ and $TE_{30}$ modes. A detailed examination would show that input pump energy in port 2 is equally divided with equal phase shifts at ports 4, 5 and 6.

The design of coupling section 37 to support only the $TE_{10}$, $TE_{20}$, and $TE_{30}$ oscillation modes is a matter within the ordinary skill of a worker in the art. The dielectric slab 39 is shown as only one example of selective dielectric loading of the modes to give the desired relative phase shifts. As is described, for example, by J. L. Altman at p. 412 to 415 of his book Microwave Circuits (Van Nostrand: 1964), the change in phase constant for any of the three modes is given by the perturbation formula $$\Delta\beta = \frac{\omega \Delta\epsilon \int_{\Delta S} |E|^2 \, dS}{4P} \qquad (5)$$

where $\omega$ is the angular frequency of the electric field E propagating in the coupling section for the mode under consideration, $\Delta\epsilon$ is the difference between the dielectric constant in dielectric slab 39 and the dielectric constant in air, P is the power flow for the mode under consideration, and the surface integral is taken over the cross-section $\Delta S$ of dielectric slab 39. If $t$ is the dielectric thickness, the change in phase constant $\Delta\beta_{10}$ for the $TE_{10}$ mode is $$\Delta\beta_{10} = \frac{4\omega^2 \mu_o \Delta\epsilon t}{\beta_{10} a} \qquad (6)$$

where $a$ is the width between walls 44 and 45 of the coupling section. For the $TE_{20}$ mode, $\Delta\beta_{20}$ is approximately 0, and for the $TE_{30}$ mode, $$\Delta\beta_{30} = \frac{4\omega^2 \mu_o \Delta\epsilon t}{\beta_{30} a} \qquad (7)$$

Using these equations a dielectric slab has been designed for operation in the directional coupler 11' at 6 kilomegacycles per second. The thickness $t$ of the slab 39 and length L between planes 42 and 43 were .0486 centimeters and 6.79 centimeters, respectively, with a relative dielectric constant of 11. The coupling section width was 8.75 centimeters. The phase shifts for the $TE_{10}$, $TE_{20}$, and $TE_{30}$ modes were then calculated at 583 degrees, 403 degrees, and 463 degrees, respectively, which in turn provides the requisite differential phase shifts of 0 degrees, 180 degrees, and −120 degrees, respectively. These conditions are calculated for a directional coupler having waveguides that are each approximately one-third the width of the coupling section. Slightly different phase shifts are calculated for other geometries.

From the foregoing, it can be seen that my directional coupler of FIG. 1 permits three nonlinear elements to be connected in parallel which effectively increases the available power of a frequency converter. The generated upper sideband output frequencies are delivered solely to port 1 and the lower sideband outputs are delivered solely to port 3, without the necessity of any attenuating filters. While the coupler 11 of FIG. 1 can be constructed in accordance with known techniques, the particular structural embodiment of FIG. 2 is comprised entirely of waveguides and offers advantages of wider bandwith. It should also be noted that the six port directional coupler of FIG. 2 may be useful in circuits other than that shown in FIG. 1. For example, the directional coupler of FIG. 2 may be used in the apparatus of the afore-mentioned Burckhardt application for increasing its bandwidth.

What is claimed is:

1. Frequency converting apparatus comprising:
a source of signal frequency energy;
a source of pump frequency energy;
a six-port directional coupler network;
means for mixing the signal and pump frequencies to generate upper and lower sideband frequencies comprising first, second, and third substantially identical nonlinear elements connected respectively to ports 4, 5, and 6 of the directional coupler network;
said signal frequency source being connected to the nonlinear elements;
the pump frequency source being connected to port 2 of the network;
means for delivering the signal frequency to the first nonlinear element at a phase angle advanced substantially 120 degrees from the phase angle of the signal frequency delivered to the second nonlinear element;
means for delivering the signal frequency to the third nonlinear element at a phase angle retarded substantially 120 degrees from the phase angle of the signal frequency delivered to the second nonlinear element;
the quantity of signal frequency energy applied to each nonlinear element being substantially equal;
transmission paths for interconnecting port 2 with ports 4, 5, and 6 and providing relative phase shifts of substantially 120 degrees each, with substantially equal power division;
transmission paths for interconnecting port 1 with ports 4, 5, and 6 and providing relative phase shifts of substantially 0 degrees, 120 degrees, and 240 degrees, respectively, between the pairs of interconnected ports, whereby there is delivered to port 1 upper sideband frequency energy that is in phase and lower sideband frequency that is out of phase; and
transmission paths for interconnecting port 3 with ports 4, 5, and 6 and providing relative phase shifts of 240 degrees, 120 degrees, and 0 degrees, respectively, between the pairs of interconnected ports, whereby there is delivered to port 3 lower sideband frequency energy that is in phase and upper sideband frequency energy that is out of phase;
the power division among the paths from each of ports 4, 5, and 6 to ports 1, 2, and 3 being substantially equal, whereby any out of phase energy incident on ports 1, 2 and 3 is mutually destructive.

2. The frequency converter of claim 1 wherein:
each of the nonlinear elements is a varactor diode.

3. The frequency converting apparatus of claim 1 wherein:
the directional coupler comprises first, second, third, fourth, fifth, and sixth waveguides, each having first ends connected to a coupling section, and having second ends which respectively comprise the six ports of the network;
the first, second, and third waveguides being arranged side by side;
the fourth, fifth, and sixth waveguides being arranged side by side respectively opposite the first, second, and third waveguides;
one end of the coupling section being defined by a first wall interconnecting corresponding walls of the first and fourth waveguides, and another end of the coupling section being defined by a second wall interconnecting the third and sixth waveguides;
said coupling section being capable of supporting only three electromagnetic wave modes of oscillation in the region between the first and second walls.

4. The frequency converting apparatus of claim 3 wherein:
the three electromagnetic wave modes of oscillation are the $TE_{10}$, $TE_{20}$, and $TE_{30}$ modes.

5. The frequency converting apparatus of claim 4 wherein:
the directional coupler network is substantially electrically symmetrical about a plane extending from the first wall to the second wall, and about a plane that substantially bisects the second waveguide and the fifth waveguide.

6. The frequency converting apparatus of claim 5 wherein:
the first, third, fourth, and fifth waveguides are of substantially the same electric length;
and the second and fifth waveguides are both substantially 60 electrical degrees longer than the other waveguides at the signal frequency.

7. The frequency converting apparatus of claim 6 wherein:
the first ends of the first, second, and third waveguides lie substantially in a first common plane;
the first ends of the fourth, fifth, and sixth waveguides lie substantially in a second common plane;
and the coupling section comprises means for providing an approximately 180 degree phase shift to energy propagating from the first plane to the second plane in a $TE_{20}$ mode with respect to energy propagating from the first plane to the second plane in the $TE_{10}$ mode, and further comprises means for providing an approximately −120 degree phase shift to energy propagating from the first plane to the second plane in the $TE_{30}$ mode with respect to energy propagating from the first plane to the second plane in the $TE_{10}$ mode.

8. A directional coupler comprising:
first, second, third, fourth, fifth, and sixth waveguides, each having first ends connected to a coupling section and having second ends which respectively comprise six ports of the directional coupler;
the first, second, and third waveguides being arranged side by side;
the fourth, fifth, and sixth waveguides being arranged side by side respectively opposite the first, second, and third waveguides;
one end of the coupling section being defined by a first wall interconnecting corresponding walls of the first and fourth waveguides, and another end of the coupling section being defined by a second wall interconnecting the third and sixth waveguides;
means for creating three electromagnetic wave modes of propagation in the region between the first and second walls;
said coupling section being capable of supporting said three electromagnetic wave modes of propagation in the region between the first and second walls.

9. The directional coupler of claim 8 wherein:
the three electromagnetic wave modes of propagation are specifically the $TE_{10}$, $TE_{20}$, and $TE_{30}$ modes.

10. The directional coupler of claim 9 wherein:
the directional coupler is substantially electrically symmetrical about a plane extending from the first wall to the second wall and about a plane that substantially bisects the second waveguide and the fifth waveguide.

11. The directional coupler of claim 10 wherein:
the first, third, fourth, and fifth waveguides are of substantially the same electrical length;
and the second and fifth waveguides are both substantially 60 electrical degrees longer than the other waveguides at the signal frequency.

12. The directional coupler of claim 11 wherein:
the first ends of the first, second, and third waveguides lie substantially in a first common plane;

the first ends of the fourth, fifth, and sixth waveguides lie substantially in a second common plane;

and the coupling section comprises means for providing a substantially 180 degree phase shift to energy propagating from the first to the second plane in a $TE_{20}$ mode with respect to energy propagating from the first to the second plane in the $TE_{10}$ mode, and further comprises means for providing a substantially —120 degree phase shift to energy propagating from the first plane to the second plane in a $TE_{30}$ mode with respect to energy propagating from the first plane to the second plane in a $TE_{10}$ mode.

13. The direction coupler of claim 12 further comprising:

a dielectric loading element included in the common channel at the location of the mode of the $TE_{20}$ mode.

References Cited

UNITED STATES PATENTS

| | | | |
|---|---|---|---|
| 2,568,090 | 9/1951 | Riblet | 325—446 |
| 2,789,271 | 4/1957 | Budenbom | 333—11 |
| 3,096,474 | 7/1963 | Marié | 332—52 X |
| 3,098,983 | 7/1963 | Oliner | 333—10 |
| 3,355,655 | 11/1967 | Burckhardt | 333—10 X |

ALFRED L. BRODY, *Primary Examiner.*

U.S. Cl. X.R.

307—88.3; 321—69; 325—446; 332—29, 42; 333—10